United States Patent
Jung et al.

(10) Patent No.: US 10,169,688 B2
(45) Date of Patent: Jan. 1, 2019

(54) METHOD OF ENHANCING QUALITY OF IMAGE OBJECT INCLUDED IN COMPOUND DOCUMENT AND APPARATUS FOR PERFORMING THE METHOD

(71) Applicant: S-Printing Solution Co., Ltd., Suwon-si, Gyeonggi-do (KR)

(72) Inventors: Joo-young Jung, Suwon-si (KR); So-hye Kim, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/424,353

(22) Filed: Feb. 3, 2017

(65) Prior Publication Data
US 2017/0243093 A1 Aug. 24, 2017

(30) Foreign Application Priority Data
Feb. 23, 2016 (KR) ................. 10-2016-0021309

(51) Int. Cl.
  *G06F 3/12* (2006.01)
  *G06K 15/02* (2006.01)
(52) U.S. Cl.
  CPC ....... *G06K 15/1872* (2013.01); *G06F 3/1208* (2013.01); *G06F 3/1244* (2013.01); *G06F 3/1285* (2013.01); *G06K 15/1836* (2013.01); *G06K 15/1855* (2013.01); *G06K 15/1889* (2013.01); *G06K 2215/0042* (2013.01)
(58) Field of Classification Search
  None
  See application file for complete search history.

(56) References Cited

U.S. PATENT DOCUMENTS

| | | | | |
|---|---|---|---|---|
| 5,999,710 A * | 12/1999 | Smith | ............ | G06K 15/12 358/1.13 |
| 6,219,149 B1 * | 4/2001 | Kawata | ............ | G06K 15/02 358/1.11 |
| 6,791,711 B1 * | 9/2004 | Uekusa | ............ | H04N 1/6027 358/1.9 |
| 6,891,970 B1 * | 5/2005 | Suzuki | ............ | G06T 11/60 382/167 |
| 2002/0067501 A1 * | 6/2002 | Watanabe | ............ | G06K 15/1859 358/1.15 |
| 2002/0097408 A1 * | 7/2002 | Chang | ............ | G06F 3/1245 358/1.6 |
| 2003/0147098 A1 * | 8/2003 | Gnutzmann | ............ | H04N 1/64 358/2.1 |

(Continued)

FOREIGN PATENT DOCUMENTS

| | | | | |
|---|---|---|---|---|
| JP | 2006-093898 | * | 4/2006 | ............ H04N 1/387 |
| JP | 4747903 B2 | | 8/2011 | |
| WO | 2015158190 A1 | | 10/2015 | |

*Primary Examiner* — Beniyam Menberu
(74) *Attorney, Agent, or Firm* — Jefferson IP Law, LLP

(57) ABSTRACT

A method of enhancing quality of an image object included in a compound document, and an apparatus for performing the method are provided. The method includes receiving a request to print a compound document including an image object, merging parts corresponding to the image object from among data corresponding to the compound document and enhancing the quality of the image object, and encoding data corresponding to the compound document by using a printer control language (PCL) and outputting the encoded data.

13 Claims, 10 Drawing Sheets

(56) References Cited

U.S. PATENT DOCUMENTS

| | | | |
|---|---|---|---|
| 2004/0252345 A1* | 12/2004 | Uekusa | H04N 1/6027 358/2.1 |
| 2005/0017986 A1* | 1/2005 | Anwar | G06T 11/60 345/629 |
| 2011/0310438 A1 | 12/2011 | Shaham et al. | |
| 2012/0050765 A1* | 3/2012 | Mori | G06K 15/1868 358/1.9 |
| 2013/0114106 A1* | 5/2013 | Sato | G06K 15/1822 358/1.15 |
| 2016/0012572 A1 | 1/2016 | Min et al. | |
| 2016/0147487 A1* | 5/2016 | Yamada | G06F 3/1219 358/1.9 |

* cited by examiner

FIG. 12

METHOD OF ENHANCING QUALITY OF IMAGE OBJECT INCLUDED IN COMPOUND DOCUMENT AND APPARATUS FOR PERFORMING THE METHOD

CROSS-REFERENCE TO RELATED APPLICATION(S)

This application claims the benefit under 35 U.S.C. § 119(a) of a Korean patent application filed on Feb. 23, 2016 in the Korean Intellectual Property Office and assigned Ser. No. 10-2016-0021309, the entire disclosure of which is hereby incorporated by reference.

TECHNICAL FIELD

The present disclosure relates to methods of effectively applying image enhancement algorithms to image objects included in compound documents and printer drivers for performing the methods.

BACKGROUND

An application that allows a document to be created and edited may be installed in a computing system such as a personal computer (PC), a smart phone, or a tablet computer. When a request to print the document created or edited in the application is input, digital data corresponding to the document is converted into a printing command and is transmitted to a printer driver installed in the computing system and the printer driver encodes the printing command by using a printer control language (PCL) supported by a printer and transmits the encoded printing command to the printer. The printer generates printing data by emulating the printing command and prints the generated printing data.

The term 'compound document' refers to a document including various types of objects such as text, graphics, and images. However, in a generally used operating system (OS) and document creation application, although an image object included in the compound document is an object expressed as a single image, the image object is divided into and expressed as a plurality of commands. Accordingly, there are restrictions in applying an image enhancement algorithm to the image object.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods of effectively applying image enhancement algorithms to image objects included in compound documents and apparatuses for performing the methods.

In accordance with an aspect of the present disclosure, a method of enhancing quality of an image object is provided. The method in a compound document includes receiving a request to print the compound document including the image object, merging parts corresponding to the image object from among data corresponding to the compound document and enhancing the quality of the image object; and encoding data corresponding to the compound document by using a printer control language (PCL) and outputting the encoded data.

In accordance with an aspect of the present disclosure, an apparatus is provided. The apparatus includes an input/output device configured to receive a request to print a compound document including an image object, a controller configured to merge parts corresponding to the image object from among data corresponding to the compound document, enhance quality of the image object, and encode data corresponding to the compound document by using a PCL, and a network interface configured to transmit the encoded data corresponding to the compound document to an image forming apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 is a diagram for explaining sharpening with respect to image enhancement algorithms according to an embodiment of the present disclosure.

Throughout the drawings, it should be noted that like reference numbers are used to depict the same or similar elements, features, and structures.

DETAILED DESCRIPTION

Figure 1:
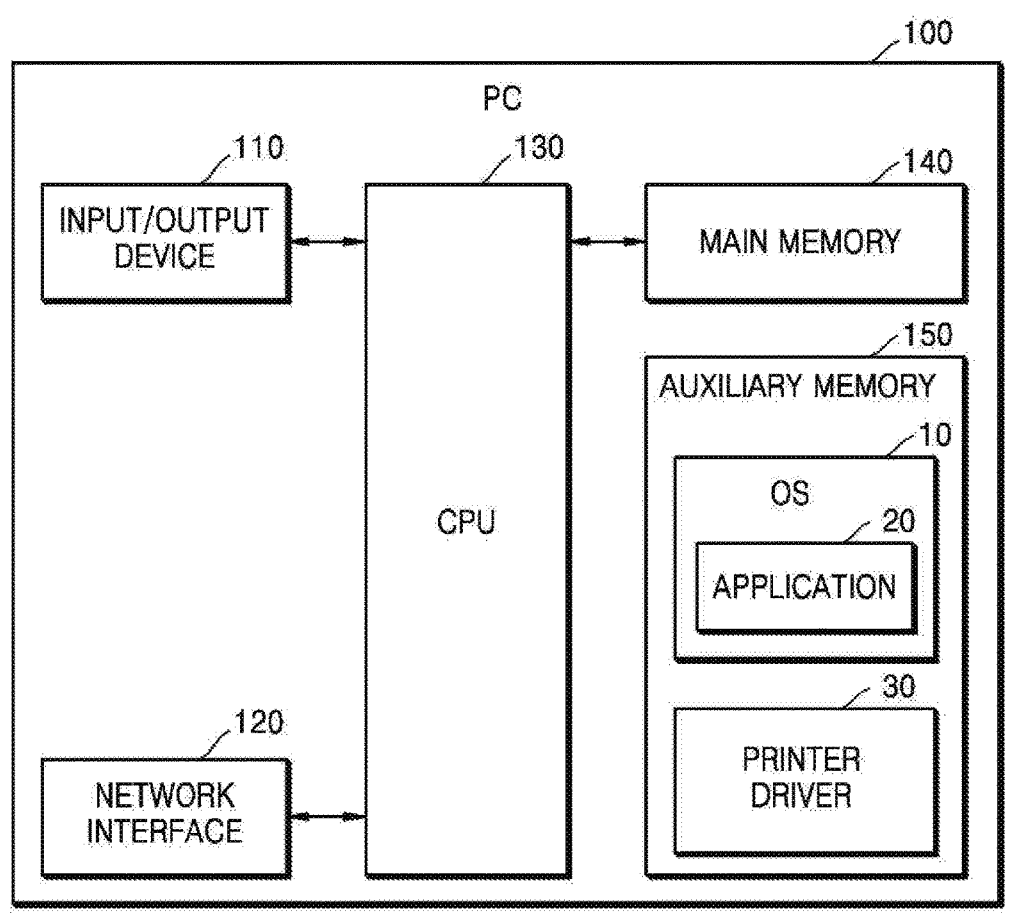
FIG. 1 is a block diagram illustrating a hardware architecture of a personal computer (PC) for performing an image enhancement method according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before specific embodiments are described, how a printer outputs a document will now be briefly explained. Although an image forming apparatus such as a multi-function printer, instead of the printer, may be used, the following will be explained on the assumption that the printer is used for convenience of explanation.

An application that allows a document to be created and edited may be installed in a computing system such as a personal computer (PC), a smart phone, or a tablet computer. The following will be explained on the assumption that the PC is used for convenience of explanation. When a request to print the document created or edited in the application is input, digital data corresponding to the document is converted into a printing command by using a standard function of an operating system (OS) installed in the PC. Examples of the printing command include a graphics device interface (GDI) command and an XML paper specification (XPS) command. Since printing commands that may be supported may vary according to printers, the digital data corresponding to the document has to be converted into a printing command that is supported by a printer connected to the PC. To this end, a printer driver that is provided by the manufacturer of the printer has to be installed in the PC. For example, the printer driver may encode the printing command by using a printer control language (PCL) such as PCL6 and may transmit the encoded printing command to the printer.

The printer generates printing data by analyzing the received printing command and prints the generated printing data.

How the printer driver enhances the quality of an image included in the document by processing the printing command according to various embodiments will now be explained. If necessary, a method of enhancing image quality by using an element other than the printer driver, for example, a module in the printer, may be performed. Alternatively, a method of enhancing image quality may be directly performed by the application that allows the document to be created and edited and installed in the PC or a mobile terminal.

FIG. 1 is a block diagram illustrating a hardware architecture of a PC 100 for performing an image enhancement method according to an embodiment of the present disclosure.

Referring to FIG. 1, the PC 100 for performing an image enhancement method according to an embodiment may include an input/output device 110, a network interface 120, a central processing unit (CPU) 130, a main memory 140, and an auxiliary memory 150.

The input/output device 110 may include an input device such as a keyboard, a mouse, or a touch screen for receiving an input from a user, and an output device such as a monitor for displaying a result obtained after processing the received input.

The network interface 120 enables the PC 100 to communicate with an external apparatus or the Internet by wire or wirelessly. In particular, the PC 100 may communicate with a printer through the network interface 120 by wire or wirelessly.

The CPU 130 temporarily stores, in the main memory 140, necessary data from among data stored in the auxiliary memory 150, and performs an arithmetic operation by accessing the main memory 140 at any time and reading the necessary data according to a control command received from the input/output device 110.

The main memory 140 is a space in which data such as a program needed while the CPU 130 performs an arithmetic operation is temporarily stored. Since the main memory 140 may be more rapidly accessed than the auxiliary memory 150, the CPU 130 retrieves data needed while a specific arithmetic operation is performed from the auxiliary memory 150, temporarily stores the data in the main memory 140, and uses the data. In general, the main memory 140 includes a volatile memory such as a random-access memory (RAM).

The auxiliary memory 150 is used to assist the main memory 140 having a limited storage capacity. Although the auxiliary memory 150 is more slowly accessed than the main memory 140, the auxiliary memory 150 includes a nonvolatile memory such as a hard disk drive (HDD) having a large storage capacity.

Since the CPU 130 accesses the main memory 140 and the auxiliary memory 150 and performs an arithmetic operation by using data such as a stored program, the CPU 130, the main memory 140, and the auxiliary memory 150 may be collectively referred to as one controller.

Referring to FIG. 1, an OS 10, an application 20, and a printer driver 30 are installed in the auxiliary memory 150. The application 20 corresponds to a program that allows a document to be created and edited. The printer driver 30 encodes a printing command by using a PCL, and may perform an image enhancement method on an image object included in a compound document as described below. How the printer driver 30 performs an image enhancement method will be explained below in detail with reference to the drawings.

Figure 2:
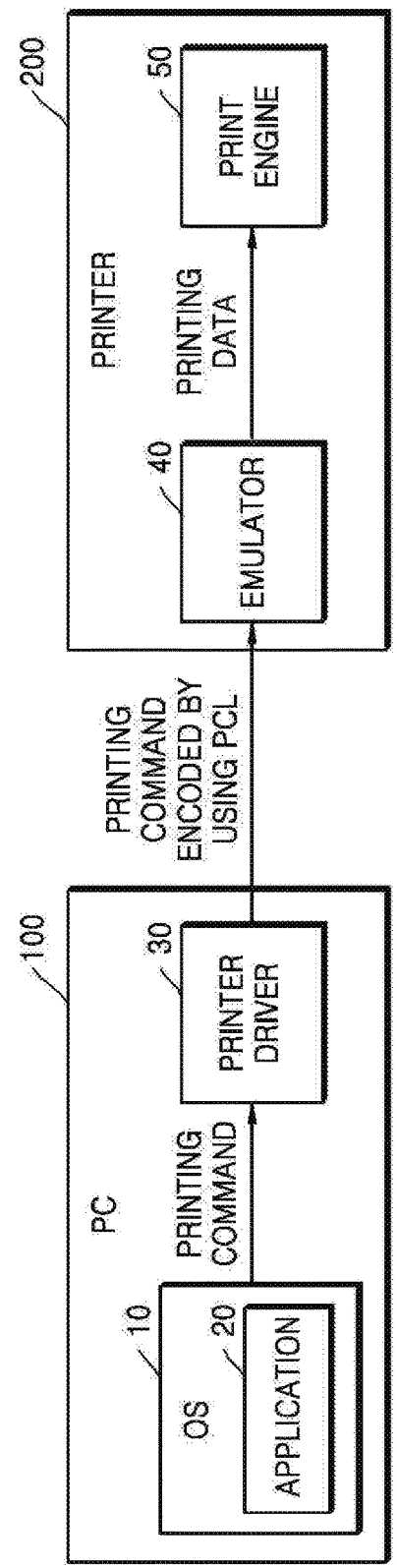
FIG. 2 is a block diagram illustrating a software architecture of a printer and the PC for performing an image enhancement method according to an embodiment of the present disclosure.

FIG. 2 is a block diagram illustrating a software architecture of a printer 200 and the PC 100 for performing an image enhancement method according to an embodiment of the present disclosure.

Referring to FIG. 2, the OS 10, the application 20, and the printer driver 30 may be installed in the PC 100, and an emulator 40 and a print engine 50 may be installed in the printer 200.

Data flow in the software architecture will now be explained. The application 20 receives a request to print a document, generates a printing command by using a standard function of the OS 10, and transmits the printing command to the printer driver 30. The printer driver 30 encodes the received printing command by using a PCL and transmits the encoded printing command to the printer 200. The emulator 40 of the printer 200 generates printing data by analyzing the received printing command and transmits the generated printing data to the print engine 50. The print engine 50 prints the received printing data.

In this case, the printer driver 30 may apply an image enhancement algorithm to an image object included in a compound document, which will be explained in more detail with reference to FIG. 3.

Figure 3:
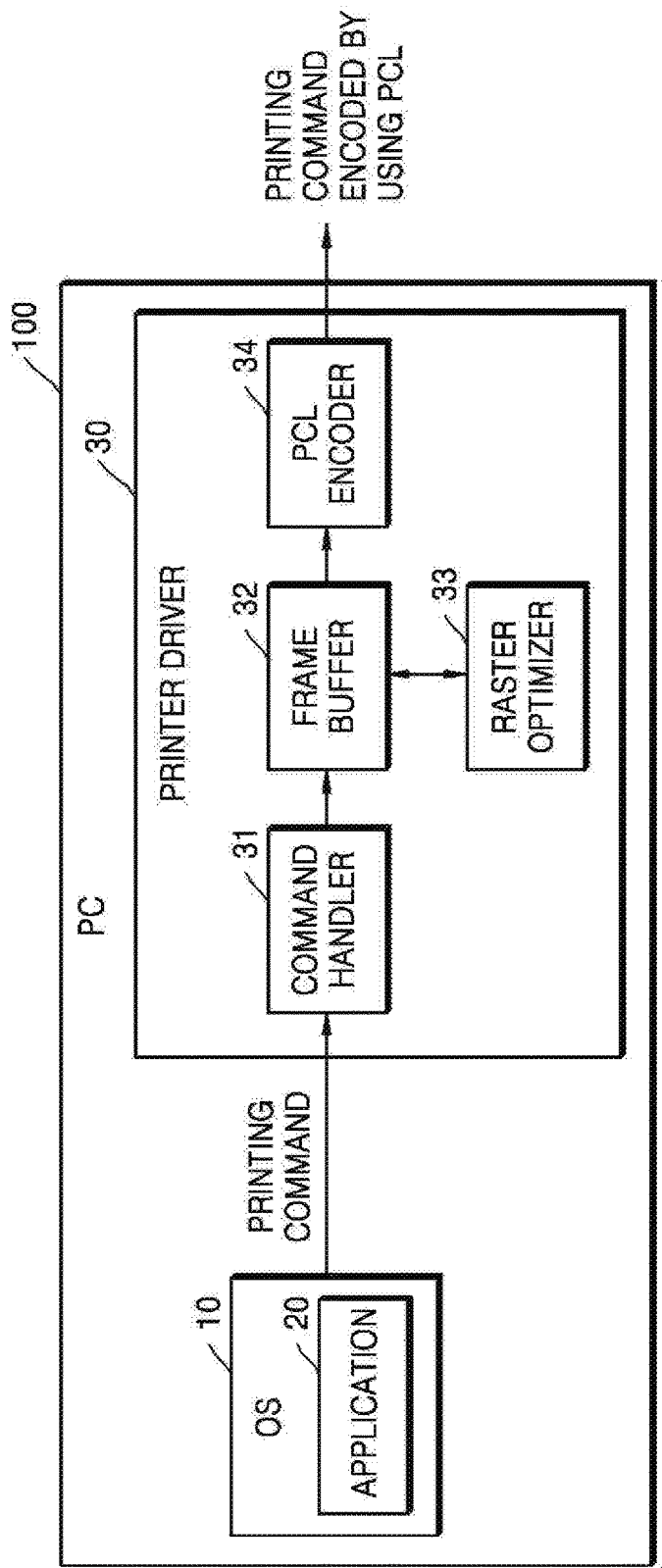
FIG. 3 is a block diagram illustrating a configuration of a printer driver from among the software architecture of the PC for performing an image enhancement method according to an embodiment of the present disclosure.

FIG. 3 is a block diagram illustrating a configuration of the printer driver 30 from among the software architecture of the PC 100 for performing an image enhancement method according to an embodiment of the present disclosure.

Before an image enhancement method performed on an image object included in a compound document is described with reference to FIG. 3, the compound document and a printing command that is generated from the compound document will now be briefly explained.

The term 'compound document' refers to a document including two or more various types of objects. The following will be explained on the assumption that the compound document includes a text object, a graphic object, and an image object. In this case, the text object includes letters or numbers, the graphic object includes lines and figures, and the image object includes pictures.

The printing command that is generated from the compound document includes commands respectively corresponding to various types of objects included in the compound document. For example, when the compound document includes a text object, a graphic object, and an image object, printing data includes a text command, a graphic command, and a raster command (corresponding to the image object).

When a general OS and a general document creation/editing application are used, an image object included in the compound document is divided into and expressed as a plurality of raster commands when the printing command is generated. In other words, although an object is expressed as a single image in a document, the object is expressed as a plurality of raster commands in the printing command and thus the plurality of raster commands respectively correspond to parts obtained by dividing the single image.

As such, since an image object is divided into and expressed as a plurality of raster commands, there are restrictions in applying an image enhancement algorithm to the image object, which will be briefly explained. In order to correct a value of a pixel at a specific position, some image quality algorithms have to use values of pixels around the pixel at the specific position. When an image is divided into parts and one of the image enhancement algorithms is applied to one of the divided parts, values of pixels in other divided parts may not be used. Accordingly, when the image enhancement algorithm is applied to each of the divided parts and then the divided parts are merged into one image, portions around the division boundary look unnatural.

For better understanding of problems that may occur when an image enhancement algorithm is applied to each of a plurality of raster commands divided from a single image, the image enhancement algorithm will now be explained in more detail. However, various embodiments are not limited thereto and an algorithm other than the following image enhancement algorithm may be used.

Examples of an image enhancement algorithm include a method of changing a color such as dynamic range expansion, contrast enhancement, or saturation enhancement and a method of improving texture of an image such as sharpening or smoothing. In order to determine a value of a specific pixel of an image to be improved, each of such image enhancement algorithms uses values of pixels located around the specific pixel. However, when the image to be improved is divided into a plurality of parts, the image enhancement algorithm may not use peripheral pixel information of pixels around a division boundary. Accordingly, when the image enhancement algorithm is applied to each of the divided parts and then the divided parts are merged into one image, portions around the division boundary look unnatural.

Sharpening will be exemplarily explained. The term "sharpening" refers to a method of obtaining an average of values of peripheral pixels located around a specific pixel, obtaining a difference between a current value of the specific pixel and the average of the values of the peripheral pixels, multiplying a weight by the difference to obtain a resultant value, and adding the resultant value to the current value of the specific pixel in order to increase the difference.

Figure 12:
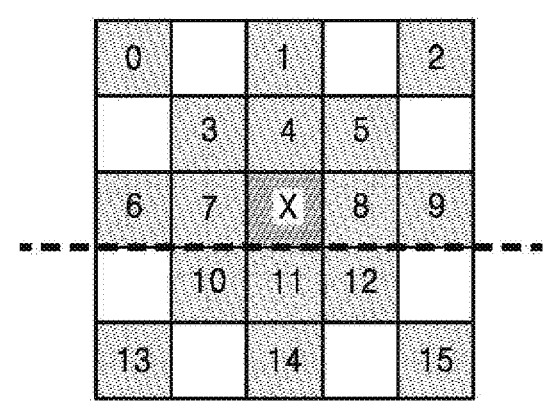

Referring to FIG. 12, values of pixels 0 through 15 located around a pixel X affect a value of the pixel X. However, when a portion under the pixel X is cut as shown in FIG. 12, since the values of the pixels 10 through 15 located in the cut portion may not be used, the value of the pixel on which sharpening is performed is different from that when sharpening is performed on the entire original image.

Contrast enhancement will now be exemplarily explained. Since an image is generally expressed by using one-byte data having values ranging from 0 to 255, a method of adjusting a gradient of an ID lockup table (LUT) based on 128 may be used. Although the method may be effective when values ranging from 0 to 255 are uniformly distributed in an image, when an image is too bright or too dark and an average is close to 0 or 255 or values in a certain range are locally concentrated on some portions of the image, quality may be rather reduced. Accordingly, a method of improving image quality by adjusting a gradient based on a total average instead of 128 or adjusting a contrast based on a relative value of each region included in the entire image is used. Even in this case, since information of peripheral pixels has to be used to adjust a value of a specific pixel, problems that are similar to those of the above sharpening may be caused.

Since dynamic range expansion is a method of improving image quality by referring to information of one entire image, when the image is divided into parts and the divided parts are merged, portions around a division boundary may look unnatural. Also, other image enhancement algorithms may have similar problems.

Since a single image is divided into a plurality of raster commands, compression efficiency may be reduced. For example, JPEG compresses 8×8 bocks as a minimum unit. When a size of an image that is divided is not a multiple of 8, compression efficiency may be reduced. When a size of the image that is divided is less than a compression minimum unit, it may better not compress the image.

Accordingly, in the following embodiment, a process is performed by merging raster commands corresponding to parts divided from one single image according to a predetermined standard and then using an image enhancement algorithm or performing compression.

Referring back to FIG. 3, a detailed configuration of the printer driver 30 is illustrated. Referring to FIG. 3, the printer driver 30 may include a command handler 31, a frame buffer 32, a raster optimizer 33, and a PCL encoder 34.

The command handler 31 receives a printing command from the application 20 and stores the printing command in the frame buffer 32. In this case, the command handler 31 stores the printing command in the frame buffer 32 in units of pages of a compound document.

When a printing command corresponding to one page of the compound document is stored in the frame buffer 32, the raster optimizer 33 merges a plurality of raster commands included in the printing command.

In this case, criteria for selecting raster commands to be merged are as follows.

First, raster commands to be merged may be determined based on an enlargement/reduction ratio between a source image and a destination image. Since information about sizes of the source image and the destination image is included in a raster command, an enlargement/reduction ratio between the source image and the destination image may be calculated for each raster command, and raster commands having the same enlargement/reduction ratio may be determined to correspond to parts divided from a single image.

Second, raster commands to be merged may be determined based on whether a destination image is close. Since information about a position of the destination image is included in a raster command, whether the destination image is close may be determined by performing comparison.

Third, when some of divided parts overlap each other, raster commands to be merged may be determined based on whether data are the same.

A method of selecting raster commands to be merged will be explained below in detail with reference to FIGS. 7 through 9.

Once the raster commands are completely merged, the raster optimizer 33 applies an image enhancement algorithm to a group of the merged raster commands. However, in a specific case, the image enhancement algorithm may not be applied to the merged raster commands. For example, when a size of a destination image is too small and thus image enhancement effect may not be expected, when a size of the merged raster commands is equal to or less than 8 bits, or when it is determined that the merged raster commands do not represent an image such as a picture, the image enhancement algorithm is not applied to the merged raster commands.

The raster optimizer 33 may compress the group of the merged raster commands.

After the raster commands are merged and the image enhancement algorithm is applied to the merged raster commands, the raster optimizer 33 may re-divide a part or the whole of the group of the merged raster commands, if necessary. For example, when another command exists between the raster commands before the raster commands are merged and an order in which an arithmetic operation is performed on the raster commands affects an output, the raster optimizer 33 re-divides the merged raster commands and arranges the raster commands according to an original command order.

When the raster optimizer 33 applies the image enhancement algorithm to the printing command and then re-transmits the printing command to the frame buffer 32, the frame buffer 32 transmits the received printing command to the PCL encoder 34.

The PCL encoder 34 encodes the received printing command by using a PCL that is supported by a printer and outputs the encoded printing command to the printer that is connected to the PC 100.

Figure 4:
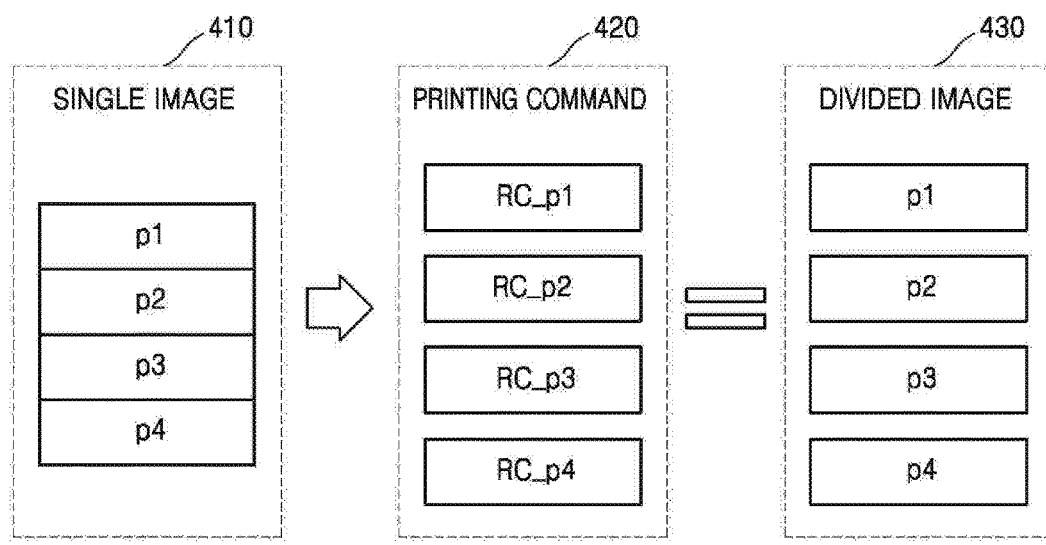
FIG. 4 is a block diagram for explaining a process of dividing and expressing a single image object into and as a plurality of raster commands, according to an embodiment of the present disclosure.

FIG. 4 is a block diagram for explaining a process of dividing and expressing a single image object into and as a plurality of raster commands according to an embodiment of the present disclosure.

Referring to FIG. 4, a single image 410, a printing command 420, and a divided image 430 are conceptually illustrated.

Referring to FIG. 4, when the printing command 420 is generated for the single image 410, the printing command 420 includes a plurality of raster commands RC_p1 through RC_p4. That is, the raster commands RC_p1 through RC_p4 included in the printing command 420 respectively correspond to parts p1 through p4 of the divided image 430. In this case, the raster command corresponding to the part p1 is denoted by "RC_p1", and a text command and a graphic command are also denoted in a similar manner below.

Figure 5:
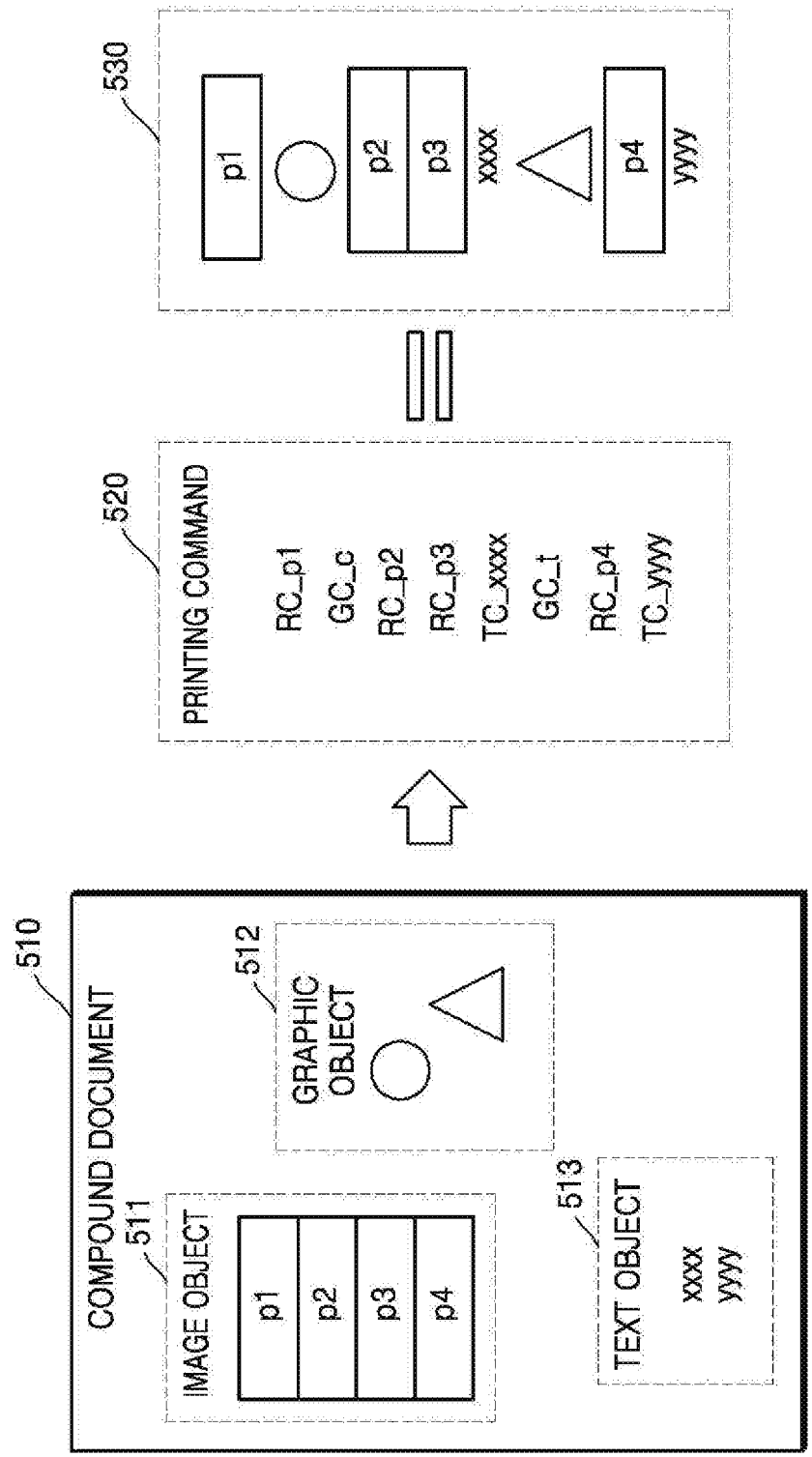
FIG. 5 is a block diagram for explaining a process of generating a printing command from a compound document including various types of objects, according to an embodiment of the present disclosure.

FIG. 5 is a block diagram for explaining a process of generating a printing command 520 from a compound document 510 including various types of objects according to an embodiment of the present disclosure.

Referring to FIG. 5, the compound document 510 includes an image object 511, a graphic object 512, and a text object 513. Commands respectively corresponding to the image object 511, the graphic object 512, and the text object 513 are included in the printing command 520 that is generated from the compound document 510. In detail, the raster commands RC_p1 through RC_p4 corresponding to parts divided from the image object 511, a graphic command GC_c corresponding to a circle of the graphic object 512, a graphic command GC_t corresponding to a triangle of the graphic object 512, and text commands TC_xxxx and TC_yyyy corresponding to the text object 513 are included in the printing command 520.

Elements of the printing command 520 are illustrated according to an order of the printing command 520 in a region 530.

As such, when the printing command 520 is generated from the compound document 510 including various objects, the image object 511 may be divided into and expressed as a plurality of raster commands and other commands may be located between the plurality of raster commands. Accordingly, in order to merge the raster commands included in the printing command 520, it may be necessary to determine whether the raster commands are divided from a single image. Criteria for determining whether raster commands are divided from a single image, that is, criteria for selecting raster command to be merged, will be explained below in detail with reference to FIGS. 7 through 9.

Figure 6:
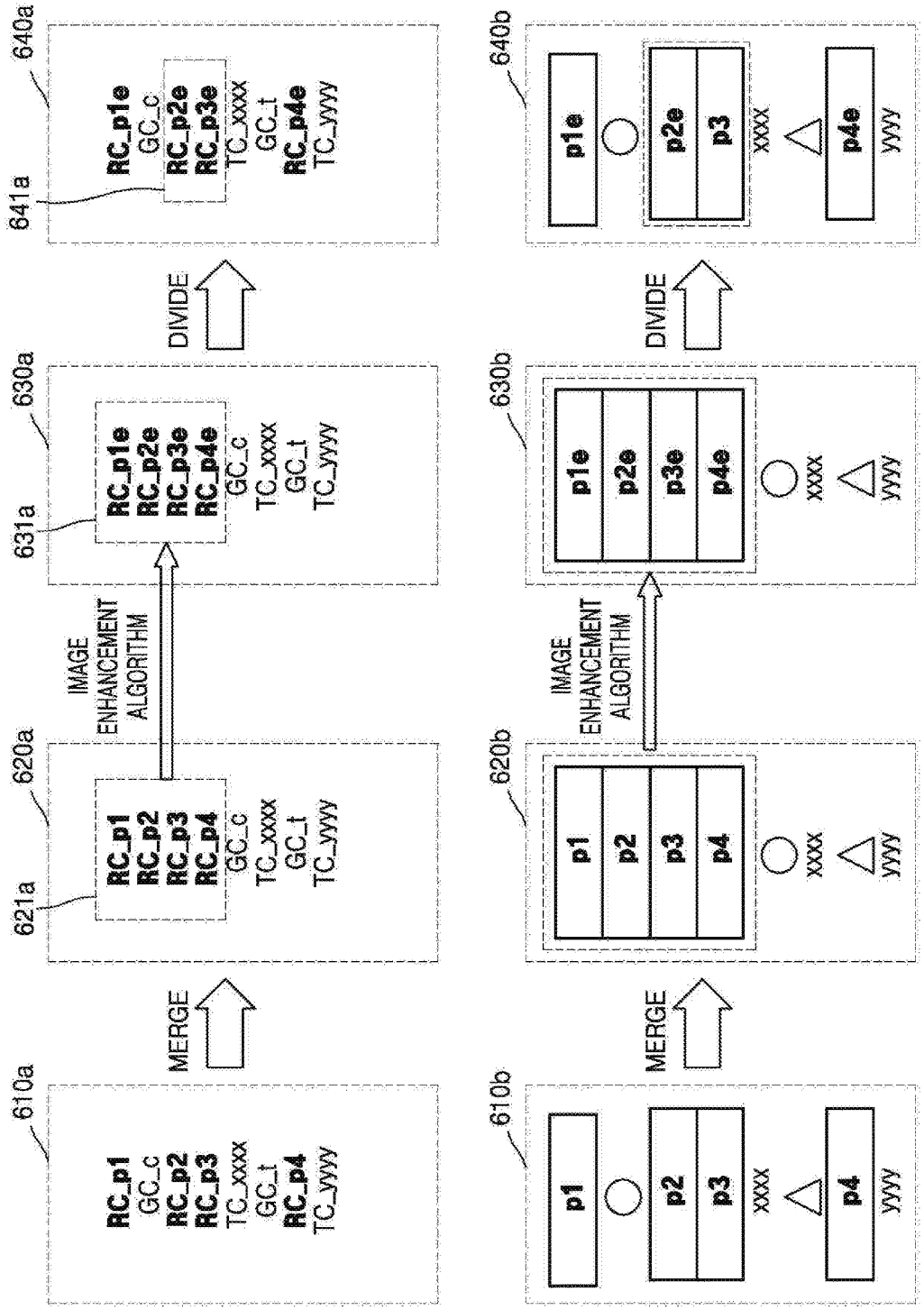
FIG. 6 is a block diagram for explaining a process of merging raster commands, applying an image enhancement algorithm, and re-dividing the raster commands, according to an embodiment of the present disclosure.

FIG. 6 is a block diagram for explaining a process of merging raster commands, applying an image enhancement algorithm, and then re-dividing the raster commands according to an embodiment of the present disclosure.

Referring to FIG. 6, printing commands are displayed in regions 610a, 620a, 630a, and 640a and elements of the printing commands are displayed in regions 610b, 620b, 630b, and 640b. Accordingly, the description of the regions 610a, 620a, 630a, and 640a also applies to the regions 610b, 620b, 630b, and 640b.

Referring to FIG. 6, the raster commands RC_p1 through RC_p4 corresponding to a single image are selected from among the printing command in the region 610a and the selected raster commands are merged. A method of selecting raster commands corresponding to a single image is the same as that described above. The printing command after the raster commands are merged is displayed in the region 620a, and a group of the merged raster commands is displayed in a region 621a.

The printing command after an image enhancement algorithm is applied to the group of the merged raster commands in the region 621a is displayed in the region 630a. A group of merged raster commands RC_p1e through RC_p4e on which the image enhancement algorithm has been applied is displayed in a region 631a.

Last, some raster commands that need to be divided in the group of the merged raster commands RC_p1e through RC_p4e in the region 631a are divided. For example, when other commands were originally located between the merged raster commands, the raster commands are divided. That is, since the graphic command GC_c was located between raster commands RC_p1e and RC_p2e and the text command TC_xxxx and the graphic command GC_t were located between the raster commands RC_p3e and RC_p4e in the printing command in the region 610a, the raster commands are divided. However, since there was no other command between the raster commands RC_p2e and RC_p3e in a region 641a, the two raster commands RC_p2e and RC_p3e may not be divided and may remain merged as one group.

Even when a group ID is assigned to the group of the merged raster commands and the group of the merged raster commands is re-divided, group information may be used in a subsequent rendering process. For example, group information assigned to the raster commands that are merged and then divided may include the group ID, the total number of raster commands included in the group, and a position of each raster command in the group, and may be used in a subsequent rendering process.

In particular, when a $1^{st}$ order or more method is used in an interpolation algorithm in a process of resizing a source image and a destination image, a division boundary is conspicuous and thus only a zero order method has to be used. However, when group information is used, adjacent raster commands may be identified and thus various algorithms may be used.

A method of selecting raster commands to be merged, that is, raster commands corresponding to a single image, from among raster commands included in a printing command will now be explained in detail with reference to FIGS. 7 through 9.

Figure 7:
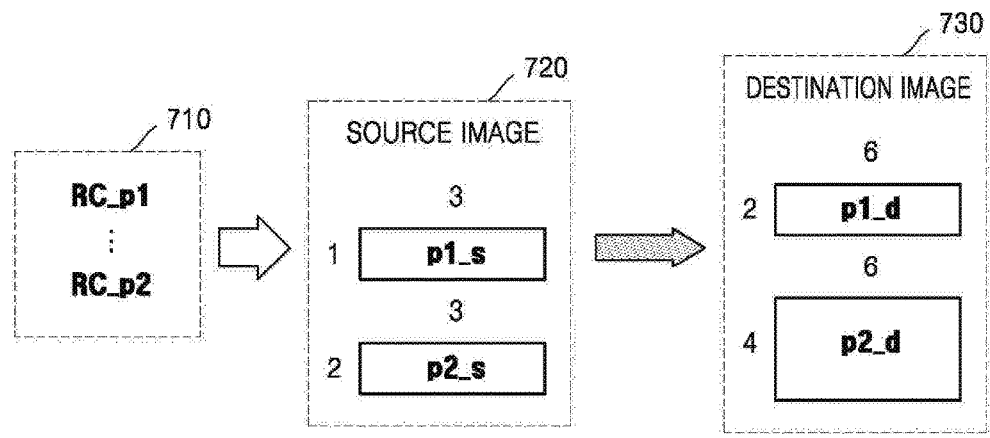
FIG. 7 is a block diagram for explaining a method of determining raster commands to be merged based on an enlargement/reduction ratio between a source image and a destination image, according to an embodiment of the present disclosure.

FIG. 7 is a block diagram for explaining a method of determining raster commands to be merged based on an enlargement/reduction ratio between a source image and a destination image according to an embodiment of the present disclosure.

Referring to FIG. 7, the raster commands RC_p1 through RC_p2 are displayed in a region 710, source images p1_s and p2_s respectively corresponding to the raster commands RC_p1 through RC_p2 are displayed in a region 720, and destination images p1_d and p2_d respectively corresponding to the raster commands RC_p1 through RC_p2 are displayed in a region 730. An enlargement/reduction ratio between source and destination images may be calculated from each raster command and the calculated enlargement/reduction ratio may be compared with that calculated from other raster commands.

In FIG. 7, for a raster command p1, an enlargement ratio from the source image p1_s to the destination image p1-d is 2 times. Also, for a raster command p2, an enlargement ratio from the source image p2_s to the destination image p2_d is 2 times. That is, since the raster commands p1 and p2 have the same enlargement/reduction ratio between the source image and the destination image, the raster commands p1 and p2 may be determined as raster commands of a single image.

Figure 8:
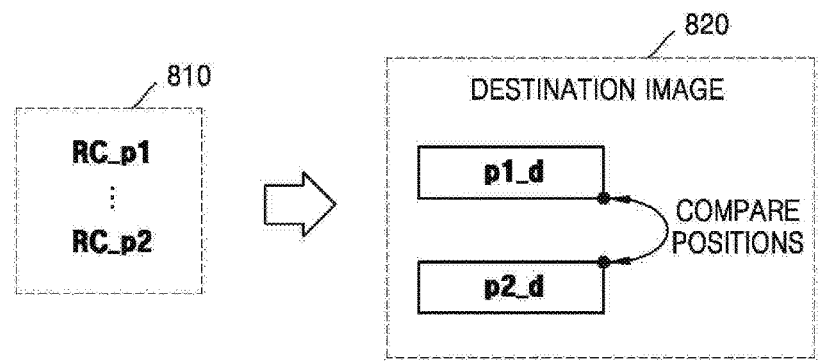
FIG. 8 is a block diagram for explaining a method of determining raster commands to be merged by comparing positions of destination images, according to an embodiment of the present disclosure.

FIG. 8 is a block diagram for explaining a method of determining raster commands to be merged by comparing positions of destination images according to an embodiment of the present disclosure.

Referring to FIG. 8, the raster commands RC_p1 and RC_p2 are displayed in a region 810 and the destination images p1_d and p2_d respectively corresponding to the raster commands RC_p1 and RC_p2 are displayed in a region 820.

In FIG. 8, whether the raster commands RC_p1 and RC_p2 correspond to a single image may be determined by comparing positions of the destination images p1_d and p2_d. That is, when the positions of the destination images p1_d and p2_d corresponding to the raster commands RC_p1 and RC_p2 are close to each other, the raster commands RC_p1 and RC_p2 may be determined to correspond to a single image.

Figure 9:
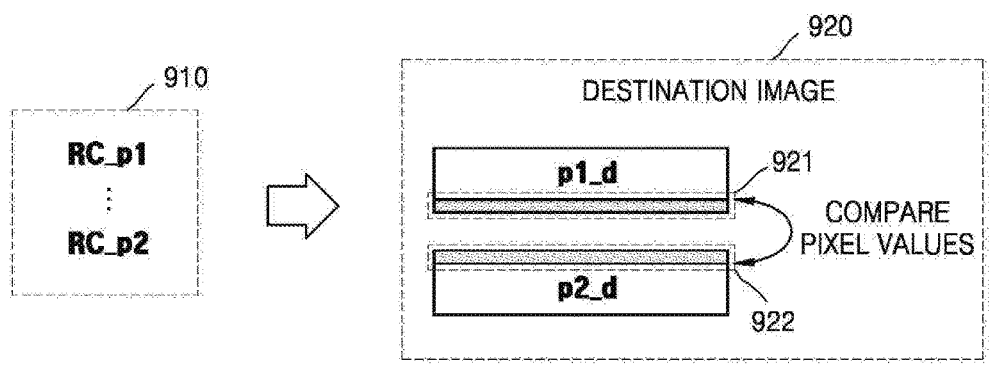
FIG. 9 is a block diagram for explaining a method of determining raster commands to be merged by comparing pixel values of overlapping areas, according to an embodiment of the present disclosure.

FIG. 9 is a block diagram for explaining a method of determining raster commands to be merged by comparing pixel values of overlapping areas according to an embodiment of the present disclosure.

Referring to FIG. 9, the raster commands RC_p1 and RC_p2 are displayed in a region 910 and the destination images p1_d and p2_d respectively corresponding to the raster commands RC_p1 and RC_p2 are displayed in a region 920.

When a plurality of raster commands are generated from a single image, some areas of one raster command may overlap some areas of another adjacent raster command. In FIG. 9, raster commands to be merged are selected according to whether pixel values of overlapping areas are the same.

Referring to FIG. 9, a pixel value of a lower portion 921 of the destination image p1_d of the raster command p1 in the region 920 is compared with a pixel value of an upper portion 922 of the destination image p2_d of the raster command p2, and when the pixel values are the same, the two raster commands RC_p1 and RC_p2 are selected as raster commands to be merged. Although destination images are exemplarily explained in FIG. 9, pixel values of source images may be compared.

Figure 10:
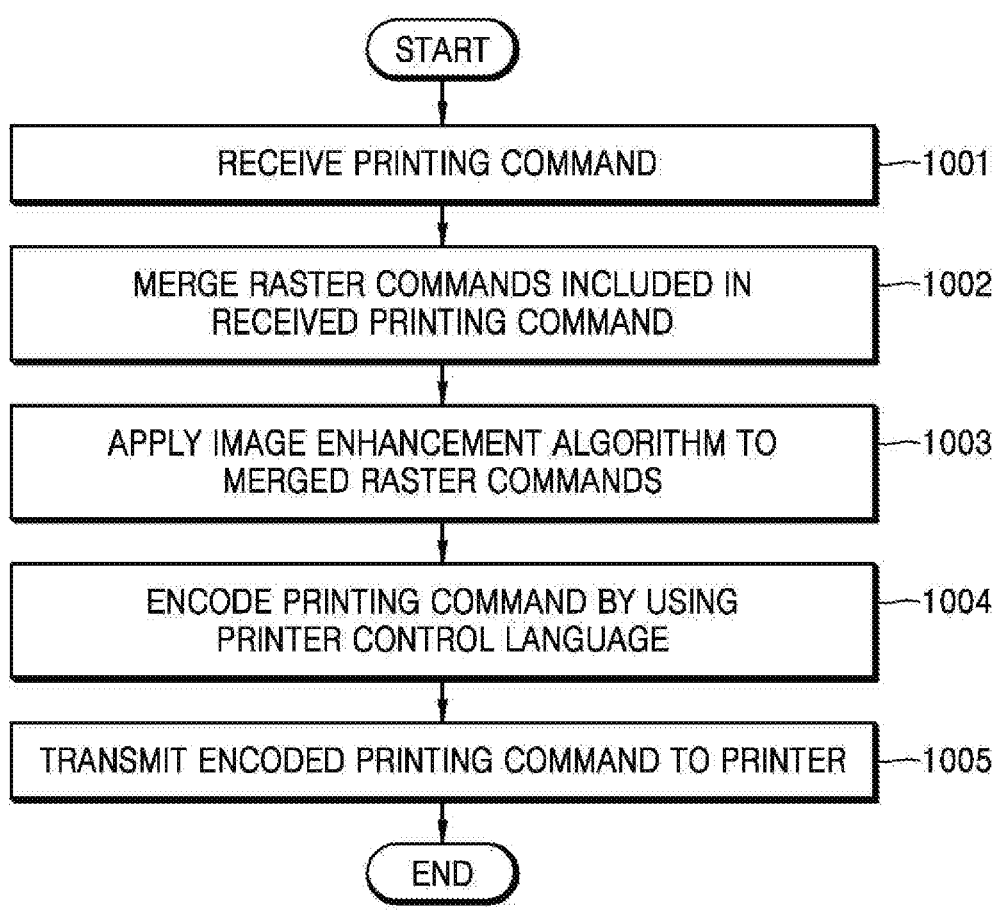
FIGS. 10 and 11 are flowcharts of an image enhancement method according to various embodiments of the present disclosure.
Figure 11:
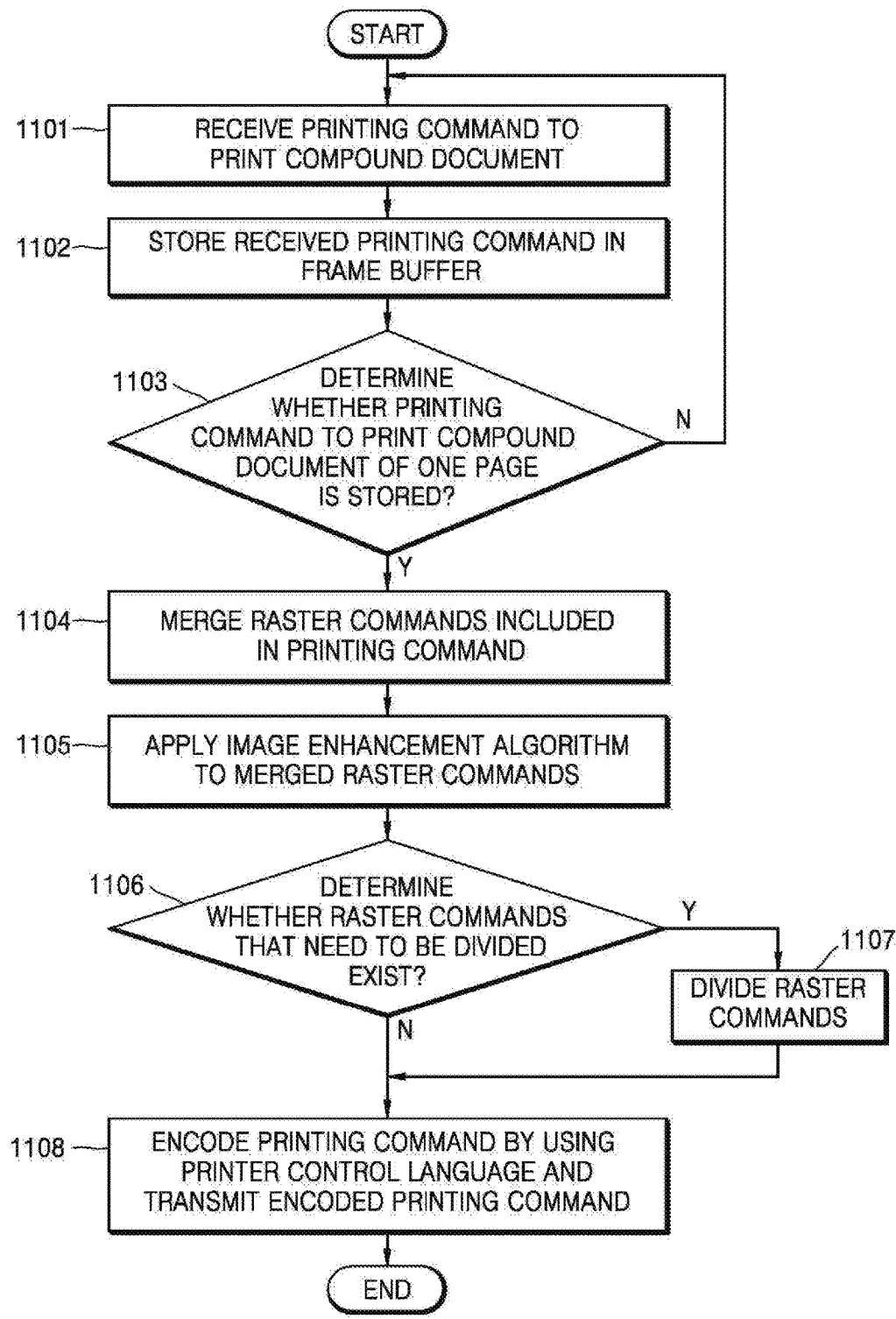

FIGS. 10 and 11 are flowcharts of an image enhancement method according to various embodiments of the present disclosure.

Referring to FIG. 10, in operation 1001, a printer driver receives a printing command to print a compound document. In this case, the printing command includes commands respectively corresponding to various objects included in the compound document.

In operation 1002, the printer driver merges raster commands included in the received printing command. In detail, the printer driver selects raster commands corresponding to a single image from among the raster commands included in the printing command and merges the selected raster commands. A method of selecting the raster commands corresponding to the single image is the same as that described with reference to FIGS. 7 through 9.

In operation 1003, the printer driver applies an image enhancement algorithm to a group of the merged raster commands. Since the image enhancement algorithm is applied to the group of the merged raster commands corresponding to the single image, problems that may occur when an algorithm is applied when raster commands are divided may be prevented.

In operation 1004, the printer driver encodes the printing command by using a PCL that may be analyzed by a printer. In operation 1005, the printer driver transmits the encoded printing command to the printer.

FIG. 11 is a detailed flowchart for explaining operations of the image enhancement method of FIG. 10.

Referring to FIG. 11, in operation 1101, the printer driver receives the printing command to print the compound document. In operation 1102, the printer driver stores the received printing command in a frame buffer in units of pages of the compound document.

In operation 1103, the printer driver determines whether the printing command of the compound document of one page is stored in the frame buffer. When it is determined in operation 1103 that the printing command of the compound document of one page is not stored yet, the method returns to operation 1101 in which the printing command is additionally received.

In contrast, when it is determined in operation 1103 that the printing command of the compound document of one page is stored in the frame buffer, the method proceeds to operation 1104. In operation 1104, the printer driver merges the raster commands included in the printing command. A method of selecting the raster commands to be merged is the same as that described with reference to FIGS. 7 through 9.

In operation 1105, the printer driver applies the image enhancement algorithm to the group of the merged raster commands.

After the image enhancement algorithm is applied to the group of the merged raster commands, the method proceeds to operation 1106. In operation 1106, the printer driver determines whether raster commands that need to be divided exist in the group of the merged raster commands. A method of determining whether raster commands that need to be divided exist is the same as that described above.

When it is determined in operation 1106 that the raster commands that need to be divided exist, the method proceeds to operation 1107. In operation 1107, the printer driver divides the raster commands, and the method proceeds to operation 1108. In operation 1108, the printer driver encodes the printing command by using the PCL and then transmits the encoded printing command to the printer.

Since raster commands corresponding to a single image are merged and then an image enhancement algorithm is applied to the merged raster commands, image enhancement effect and efficiency may be improved.

The various embodiments may be embodied in a general-purpose digital computer by running a program from a non-transitory computer-readable recording medium. Examples of the non-transitory computer-readable recording medium include storage media such as magnetic storage media (e.g., read only memories (ROMs), floppy discs, or hard discs), optically readable media (e.g., compact disk-read only memories (CD-ROMs), or digital versatile discs (DVDs)), etc.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of enhancing quality of an image object included in a compound document comprising two or more types of objects, the method comprising:
   receiving a printing command to print the compound document, the printing command including a plurality of divided raster commands corresponding to the image object;
   merging the plurality of divided raster commands corresponding to the image object;
   assigning a group identification (ID) to a group of the merged raster commands;
   applying an image enhancement algorithm to the merged raster commands;
   re-dividing the merged raster commands;
   assigning group information comprising the group ID, a number of commands included in the group, and positions of the re-divided raster commands in the group, to raster commands that are re-divided from the merged raster commands;
   encoding data corresponding to the printing command by using a printer control language (PCL); and
   outputting the encoded data.

2. The method of claim 1, wherein the merging of the plurality of raster commands comprises:
   calculating an enlargement or reduction ratio between a source image and a destination image of each of the plurality of raster commands; and
   merging raster commands having a same enlargement or reduction ratio.

3. The method of claim 1, wherein the merging of the plurality of raster commands comprises:
   selecting adjacent raster commands by comparing positions of destination images of the plurality of raster commands; and
   merging the selected adjacent raster commands.

4. The method of claim 1, wherein the merging of the plurality of raster commands comprises:
   comparing pixel values of overlapping areas of the plurality of raster commands; and
   merging raster commands having overlapping areas having a same pixel value.

5. The method of claim 1, wherein the re-dividing of the merged raster commands comprises dividing the merged raster commands based on an order of commands included in the printing command before the plurality of raster commands are merged.

6. The method of claim 1, wherein the merging of the plurality of raster commands is performed in units of pages of the compound document.

7. A non-transitory computer-readable recording medium having instructions encoded thereon for enhancing quality of an image object included in a compound document comprising two or more types of objects, the non-transitory computer-readable recording medium comprising:
   instructions for receiving a printing command to print the compound document, the printing command including a plurality of divided raster commands corresponding to the image object;
   instructions for merging the plurality of divided raster commands corresponding to the image object;
   instructions for assigning a group identification (ID) to a group of the merged raster commands;

instructions for applying an image enhancement algorithm to the merged raster commands;
instructions for re-dividing the merged raster commands;
instructions for assigning group information comprising the group ID, a number of commands included in the group, and positions of the re-divided raster commands in the group, to raster commands that are re-divided from the merged raster commands;
instructions for encoding data corresponding to the printing command by using a printer control language (PCL); and
instructions for outputting the encoded data.

8. An apparatus comprising:
an input/output device to receive a printing command to print a compound document, the printing command including a plurality of divided raster commands corresponding to an image object of the compound document;
at least one processor to:
merge the plurality of divided raster commands corresponding to the image object,
assign a group identification (ID) to a group of the merged raster commands,
apply an image enhancement algorithm to the merged raster commands,
re-divide the merged raster commands,
assign group information comprising the group ID, a number of commands included in the group, and positions of the re-divided raster commands in the group, to raster commands that are re-divided from the merged raster commands, and
encode data corresponding to the printing command by using a printer control language (PCL); and
a network interface to transmit the encoded data to an image forming apparatus.

9. The apparatus of claim 8, wherein the at least one processor:
calculates an enlargement or reduction ratio between a source image and a destination image of each of the plurality of raster commands, and
merges raster commands having a same enlargement or reduction ratio.

10. The apparatus of claim 8, wherein the at least one processor:
selects adjacent raster commands by comparing positions of destination images of the plurality of raster commands, and
merges the selected adjacent raster commands.

11. The apparatus of claim 8, wherein the at least one processor:
compares pixel values of overlapping areas of the plurality of raster commands, and
merges raster commands having overlapping areas having a same pixel value.

12. The apparatus of claim 8, wherein the at least one processor divides the merged raster commands based on an order of commands included in the printing command before the plurality of raster commands are merged.

13. The apparatus of claim 8, wherein the at least one processor merges the plurality of raster commands in units of pages of the compound document.

* * * * *